United States Patent [19]

Noehren et al.

[11] 4,008,980
[45] Feb. 22, 1977

[54] COMPOSITE HELICOPTER SPAR AND MEANS TO ALLEVIATE STRESS CONCENTRATION

[75] Inventors: William Lawrence Noehren, Huntington; Edward Stanley Hibyan, Trumbull, both of Conn.

[73] Assignee: United Technologies Corporation, Hartford, Conn.

[22] Filed: June 26, 1975

[21] Appl. No.: 590,773

[52] U.S. Cl. .......................... 416/134 A; 416/226; 416/230
[51] Int. Cl.$^2$ .................. B64C 11/04; B64C 27/46
[58] Field of Search .......... 416/226, 134, 135, 138, 416/230, 241 A

[56] References Cited
UNITED STATES PATENTS

| 2,363,469 | 11/1944 | Goldschmidt | 416/134 |
| 3,484,174 | 12/1969 | McCoubrey | 416/226 |
| 3,669,566 | 6/1972 | Bourquardez et al. | 416/134 |
| 3,804,552 | 4/1974 | Covington | 416/138 |
| 3,874,815 | 4/1975 | Baskin | 416/141 |
| 3,874,820 | 4/1975 | Fenaughty | 416/226 |

Primary Examiner—William L. Freeh
Assistant Examiner—Thomas I. Ross
Attorney, Agent, or Firm—Vernon F. Hauschild

[57] ABSTRACT

A cross-beam helicopter rotor wherein the pitch actuator shaft passes through an elliptically shaped hole in the unidirectional, composite helicopter spar, each of selected dimension so that the stress concentration factor across the spar at the hole is minimized when the spar is carrying balanced centrifugal blade loads. The shaft also passes through a centering pin which is supported in the spar hole by an elliptically shaped plug of selected dimension so that when supported from the spar hole by elastomer of selected shape factor, durometer and dimension, the plug and pin are load isolated from the spar and the stress concentration factor across the spar at the hole is substantially unchanged from that of the unplugged hole both during balanced and unbalanced centrifugal blade load operation of the spar, and so that the elastomer transmits unbalanced centrifugal blade loads therethrough from the spar to the plug and pin for centering the rotor.

18 Claims, 9 Drawing Figures

Fig. 9

COMPOSITE HELICOPTER SPAR AND MEANS TO ALLEVIATE STRESS CONCENTRATION

BACKGROUND OF THE INVENTION

1. Field of the Invention

This invention relates to helicopter rotors and more particularly to cross-beam rotors wherein a blade is suspended from the ends of one or more unidirectional, composite spars and in which the pitch control mechanism passes through the rotor at the center of rotation. More particularly, the pitch control shaft passes through a floating centering member supported in a selectively shaped hole through the spar so as to substantially reduce the stress concentration factor across the spar at the hole and react unbalanced blade centrifugal loads.

2. Description of the Prior Art

It is known in the prior art to control the pitch of rotors of this type through pitch control mechanism located external to the spar which requires no hole but produces an unacceptably heavy control mechanism which creates substantial parasitic and aerodynamic drag and is prone to ballistic damage. For example, in earlier helicopter rotor constructions a plurality of pitch change servos were supported external of the rotor spar and connected to each blade through a swashplate or other conventional pitch change mechanism to effect blade pitch variation.

SUMMARY OF THE INVENTION

A primary object of the present invention is to provide a pitch change mechanism for a cross-beam rotor wherein the pitch change mechanism passes through the rotor along its axis of rotation and is actuated by a servomechanism embedded within the helicopter and therefore neither creates parasitic or aerodynamic drag nor is vulnerable to ballistic damage.

In accordance with the present invention, a hole of selected shape is produced in the unidirectional, composite plate-shaped spar of the rotor, and a pitch actuator shaft extends reciprocally through the spar hole. The shaft passes through a floating plug and centering member of selected size and shape and selectively suspended in the spar hole by elastomer of selected shape factor, durometer and dimension so that the stress concentration factor across the spar at the hole is drastically reduced when the spar is reacting substantially balanced blade centrifugal loads and which has the capability of withstanding the required unbalanced blade centrifugal loads.

In accordance with the teaching of this invention, the ratio of the dimension of the spar hole normal to the spar span at the axis of rotation to the dimension of the elastomer at the opposite ends of the floating plug and centering member along the spar span is between 7 and 10.

According to the teaching of this invention, an elastomer is selected to support the load isolated centering member with the composite spar hole, which elastomer is complaint enough to prevent the floating centering member from disturbing the smooth and uniform stress flow pattern around the spar elliptical hole during balanced centrifugal load operation, but stiff enough to transfer any unbalanced centrifugal spar loads to the centering member and thence back into the rotor hub and fuselage.

In accordance with a further aspect of the present invention, the blade pitch actuator shaft extends through an elliptically shaped hole in the spar, which hole is concentric about the blade axis of rotation and had its major axis extending along the spar span and wherein the pitch actuator shaft passes through a centering pin which engages a plug member floating supported within the elliptical spar hole by elastomer of selected shape factor, durometer and dimension such that the stress concentration factor across the spar at the hole is drastically reduced when the spar is reacting balanced and unbalanced centrifugal blade loads. The elastomer is also selected to be able to withstand the anticipated unequal centrifugal loading of the spar.

In accordance with the teaching of this invention the floating centering member is suspended in load isolation from the spar so that the presence of the centering pin and its support mechanism does not disturb the flow of stress around the spar both in balanced or unbalanced centrifugal load operation.

An aspect of this invention is to insulate the composite spar from the centering member by means of the elastomer so that when the spar stretches under blade centrifugal loading, the centering member is not loaded by the stretching of the spar due to the load isolating action of the elastomer. Accordingly, there is no loading of the centering member to adversely affect the smooth and uniform stress flow pattern in the spar hole.

In accordance with the teaching of this invention, a cross-beam rotor spar is produced by first determining the optimum shape of the hole in the composite spar under the action of balanced centrifugal loads. This unplugged spar hole should be so dimensioned that the spar has sufficient tensile strength to withstand all anticipated blade loading and so that the stress concentration factor $K_T$ across the spar at the hole is a minimum. Then, the shape and dimension of the spar centering member and the elastomer which will support the centering member is a load-isolated floating relationship from the spar hole is determined so as to produce minimum increase in the stress concentration factor ($K_T$) across the spar hole. This is accomplished by using finite element structural computer programs and theoretical springs to represent the elastomer supporting the floating centering member from the spar hole so as to determine the optimum shape of the centering member and the optimum shape and qualities of the elastomer. Finally, with the dimension and shape of the centering member and elastomer so determined, we ascertain the maximum unbalance centrifugal blade load that can be transmitted through the elastomer and compare that with design requirements to insure adequacy.

In accordance with this invention, the elastomer is selected so that when the centering member is centering the spar during unbalanced centrifugal load operation, the centering member loading is imparted to the spar aperture so as to not adversely affect the stress concentration factor across the spar and so that during operation at balanced centrifugal load conditions the stress concentration factor across the spar at the aperture minor axis is unaffected by the presence of the centering member and elastomer therein.

DESCRIPTION OF THE PREFERRED EMBODIMENT

Figure 1:
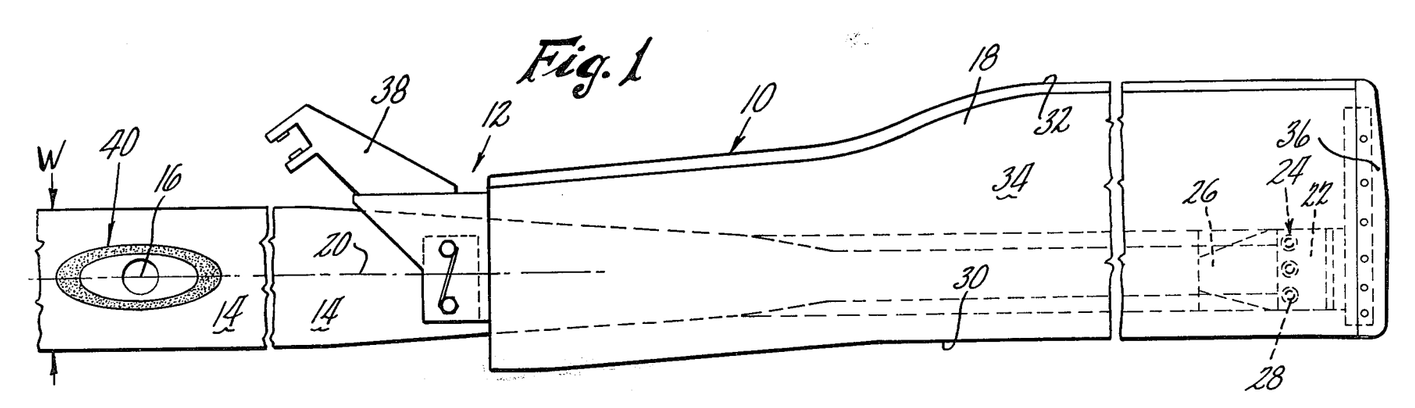
FIG. 1 is a showing of one blade of a two-bladed cross-beam rotor utilizing our invention.

Referring to FIG. 1 we see one blade 10 of a cross-beam rotor 12 which comprises cross-beam spar 14 mounted for rotation about axis of rotation 16 and extending radially symmetrically on opposite sides thereof and with each end of spar 14 carrying a rotor blade 18. Spar 14 is a composite, flexible plate member of selected width W and thickness $t$ at the axis of rotation 16 and comprising a plurality of unidirectional high modulus, high tensile strength fiber members, such as graphite fibers extending parallel to one another and parallel to the spar span or pitch change axis 20 and joined by a conventional binder such as an epoxy. The fibers of spar 14 could also be made of boron, fiber glass of Kevlar, which is manufactured by the Textile Fibers Department of Dupont of Richmond, Virginia. A blade, such as 18, is supported from the outer end 22 of spar 14 through a conventional connecting mechanism 24, which may comprise plate members, such as 26, positioned on the top and the bottom of spar 14 so that one or more bolt or screw members 28 may pass through aligned holes in blade 18, top and bottom plate members 26 and spar 14 so as to support a blade 18 from each outer end 22 of spar 14.

Blade 18 is preferably of lightweight construction, such as epoxy bonded fiber glass cloth and may be supported from spar 14 by a selectively shaped lightweight core, which may be made of honeycomb, so that blade 18 is mounted from spar 14 so as to define leading edge 30, trailing edge 32 and airfoil shaped central portion 34 therebetween. A tip cap member 36 may be attached in conventional fashion to the tip of blade 18 and pitch horn 38 projects from the inner end of the blade so that as force is applied to the pitch change mechanism to be described hereinafter in and out of the paper in the FIG. 1 embodiment, blade 18, and the corresponding blade at the opposite end of spar 14 (not shown) will change in pitch about the blade feathering axis which is coincident with blade span 20 as composite spar 14 is caused to twist or flex about its span and feathering axis 20. Spar 14 includes floating centering mechanism 40 at its center and this mechanism 40 will be described in greater particularity hereinafter.

It is believed that this is sufficient description of cross-beam rotor 12, which may be of the type shown in greater particularity in U.S. Pat. No. 3,874,820 and U.S. patent application Ser. No. 132,459, filed on April 8, 1971 in the name of P. J. Arcidiacono on improvements in "Helicopter Rotor System", to which reference may be had.

Figure 2:
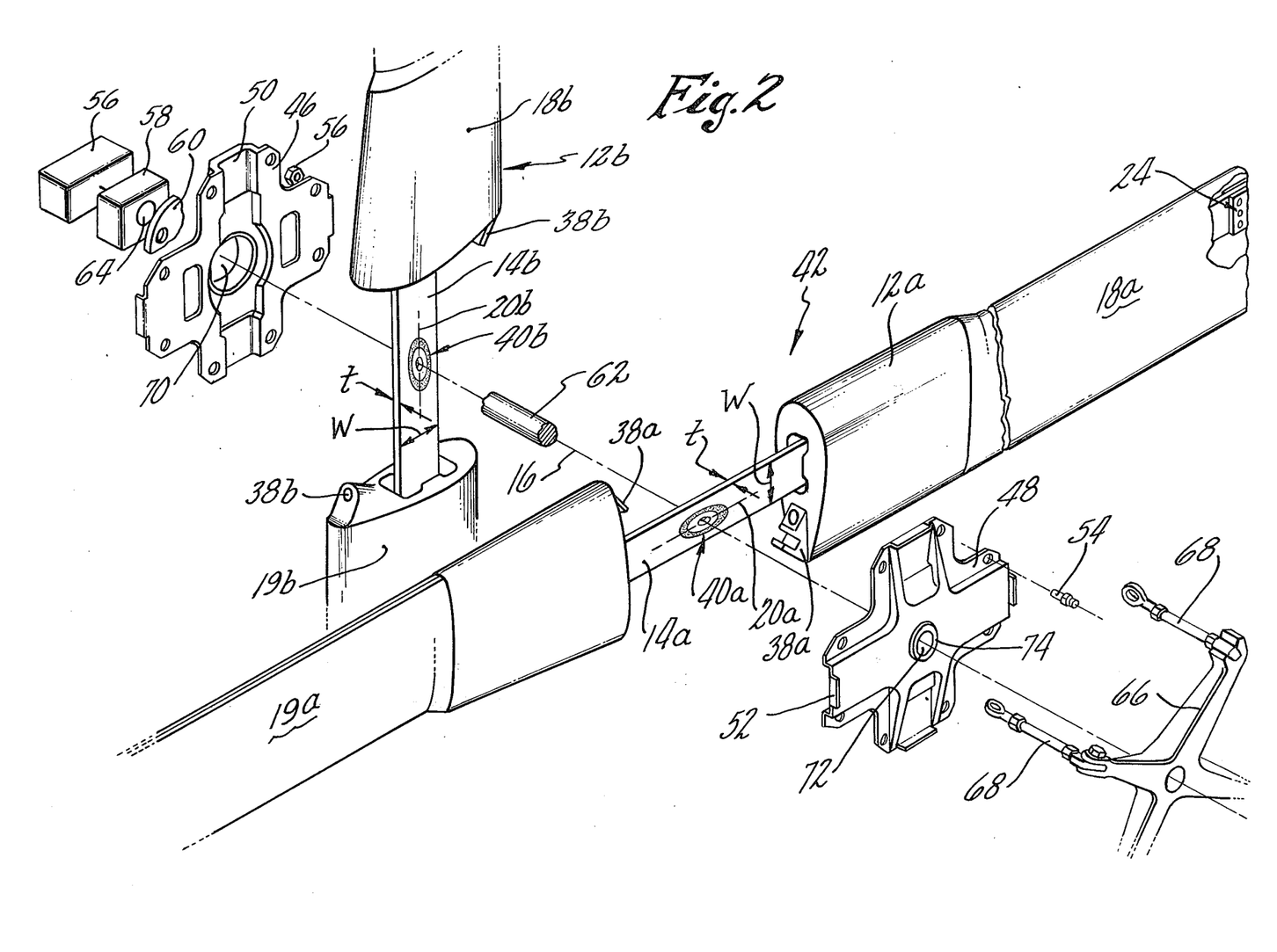
FIG. 2 is an exploded view of a four-blade cross-beam rotor utilizing our invention.

Referring to FIG. 2, we see our invention used as part of a four-bladed cross-beam rotor 42 which comprises first two-bladed rotor 12a and second two-bladed rotor 12b, each consisting of blades 18a and 19a and 18b and 19b, respectively, supported from opposite ends of unidirectional composite plate-shaped spars 14a and 14b. Rotors 12a and 12b are mounted 90° to one another and are drivingly rotatable about axis of rotation 16. Each blade has a pitch horn, such as 38a and 38b, to effect pitch change motion of the blade in a manner to be described hereinafter about span or feathering axis 20a and 20b.

Retention plate members 46 and 48 positioned on opposite sides of rotors 12a and 12b and each includes a channel section 50 and 52 to matingly receive spars 14b and 14a, respectively, and retain the spars secured in juxtaposition to form four-bladed cross-beam 42. Connecting means, such as bolt and nut members 54 and 56 pass through aligned holes in retention plates 46 and 48 to retain the plates and hence the spars and blades in position.

A conventional engine 56, which is preferably mounted in or on the helicoper fuselage, drives rotor 42 for rotation about axis 16 through conventional transmission 58, which is also mounted within the helicopter. A conventional driveshaft or coupling member, shown partially at 60, and which may be a hollow member connected through splines 61 (see FIG. 9) to the transmission drive shaft 63 and retention plate 46, serves to drive rotor 42 from transmission 58.

Figure 9:
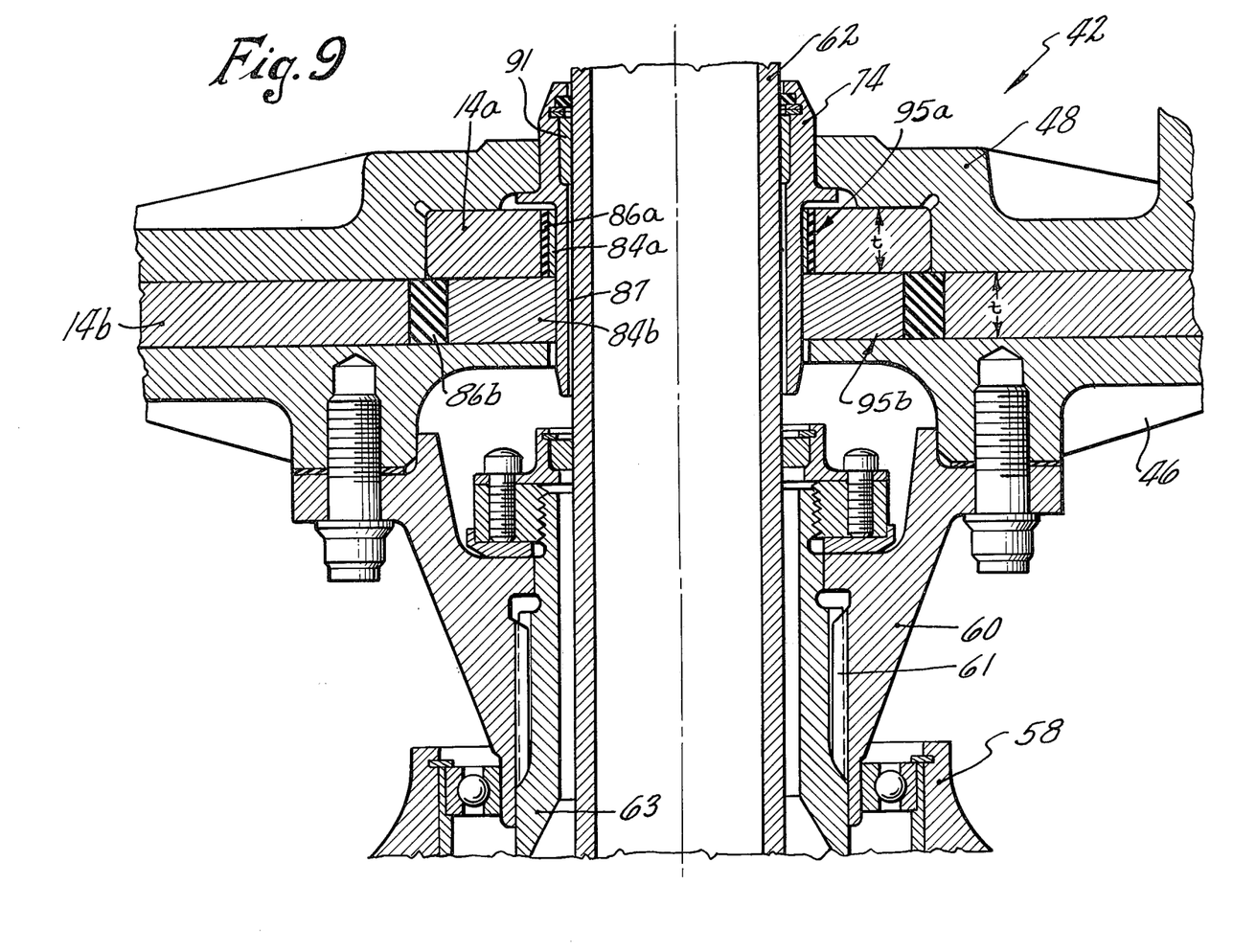
FIG. 9 is a cross-sectional showing of the two spars joined by retention plates.

This connection between rotor 42 and transmission 58 is best shown in FIG. 9, which also serves to show our two spars in their asembled relationship between retaining plate members 46 and 48, wherein the spars 14a and 14b are oriented at right angles to one another. As shown in FIG. 9, which is a cross-sectional showing taken along the span of spar 14b, the thickest section of plug member 84b and elastomeric member 86b are located on the span of spar 14b. Since spar 14a is oriented 90 degrees in spar 14b, FIG. 9, depicts the thinnest section of plug member 84a and elastomeric member 86a of spar 14a. By viewing of FIG. 9, it will be noted that annular running clearance 87 exists between spar centering pin 74 and pitch change shaft 62 to assure that shaft 62 is free to reciprocate at all times in pitch change motion within centering pin 74. If clearance 87 were not maintained, centering pin 74 would bear against shaft 62 during unbalanced centrifugal load operation of rotor 42 and thereby prevent pitch change motion of shaft 62. With this clearance 87 maintained, the centrifugal loads of spars 14a and 14b are imparted to centering pin 74 and transferred therefrom through retaining plate members 48 and 46, and coupling and shaft members 60 and 63 to transmission 58 or another rugged helicopter mounted member capable of carrying such loads.

Rotor 42, which may be either the main rotor or a tail rotor for helicopter, is shown in FIG. 2 preferably as a tail rotor and the mechanism to cause the blades 18a, 18b, 19a and 19b to change pitch will now be described.

Those skilled in the art will realize that plug 84 and centering pin 74 coact for form centering member 95, and could be integral. We choose to make them separate so that centering pin 74 could be made of a good journal material and so that plug 84 could be made of some lightweight, high strength material such as titanium.

Pitch actuator shaft 62 is supported in conventional fashion to be concentric about axis of rotation 16 and is caused to reciprocate therealong by a single, conventional hydraulic or pneumatic cylinder-piston servo actuator 64, which is mounted in the housing of transmission 58 for ballistic protection. Pitch actuator shaft 62 extends between and is connected to pitch change servo 64 and pitch beam 66, which is preferably a star-shaped member having as many arms as there are blades in the rotor and which has a pitch control link, such as 68, extending from each arm and connecting to the blade pitch horns 38a and 38b so that actuation in reciprocating motion of pitch actuator shaft 62 along axis of rotation 16 carries pitch beam 6 therewith and thereby causes the blades 18a, 18b, 19a and 19b to vary in pitch collectively due to the simultaneous twisting of spars 14a and 14b about their span or feathering axes 20a and 20b. Cyclic pitch changes are not required in a tail rotor.

An important feature of this invention is that pitch actuator shaft 62 extends through spars 14a and 14b, and more particularly through the floating centering members 40a and 40b therein, whose centers are aligned with corresponding apertures 70 and 72 in retention plates 46 and 48 along axis 16. Centering pin 74 extends through retention plates 46, 48 and the floating centering members 40a and 40b in spars 14a and 14b so that pitch actuator shaft 62 may pass freely therethrough so as to be reciprocal therewith along axis 16 to effect the aforementioned collective pitch change motion of the blades.

In modern helicopter rotor design, it is essential that he rotor be as lightweight as possible and yet capable of withstanding the various loads which are imparted thereto. The cross-beam rotor is capable of achieving these objectives, in part, because spars 14a and 14b are not made of heavy metal but are composite plate members comprisng a plurality of high tensile strength, high modulus fibers of graphite or other material extending unidirectionally and in parallel relationship therealong and parallel to spar span 20a and 20b and bonded together in conventional fashion by a binder, such as an epoxy. Such a spar construction is light in weight and capable of withstanding heavy loads in tension, such as the centrifugal loading from the blades carried at the opposite ends thereof, yet is capable of flexing along its length. When holes must be passed through the composite spar, the aforementioned fibers are necessarily severed and the strength of the spar can be adversely affected thereby. Accordingly, the shape of the hole passing through these composite spars and the procedure and mechanism for floating a centering member therein to permit the passage of pitch actuator shaft 62 therethrough are of prime importance and serve to effect weight savings, and a reduction in drag and ballistic vulnerability over the prior art construction in which separate servos were mounted external of the blades to actuate pitch beam 66.

It is belived that a maximum appreciation for the shape of the hole through the spar and the construction contained therein can best be appreciated by understanding the process which we went through in determining optimum spar hole shape and the manner of suspending a centering member therein.

Our first constraint was that we wanted to reduce weight by utilizing the cross-beam rotor concept. This concept required use of a composite, lightweight spar so that blade pitch change motion could be achieved by deflecting the composite spar. This concept ruled out the use of a metal spar because it would not have sufficient torsional flexibility to permit the required pitch change motions. The width W and thickness $t$ of this composite spar must be selected so as to be able to withstand the loads and stresses which will be imparted to the spar during rotor operation and so as to avoid resonance with the natural frequency of the blades and their supportng mechanism.

The second requirement to be met was the ability to change the pitch of the blades of the rotor. This could be accomplished by hanging servos and other hardware external of the rotor or by passing a single pitch change rod through the rotor. The former solution is very heavy in weight and provides substantial parasitic drag so therefore is highly undesirable. We therefore attempted to work out a solution whereby the pitch change rod would pass through the spar but, of course, this required making a hold in the spar through which the pitch change rod would pass. This presented problems because this meant the severing of the high tensile strength fibers which were extending through our spar. We decided, however, to attempt to pass the pitch change control rod through the spar in that this would provide a simplier and lighter system and would reduce the ballistic vulnerability of the system. This required that we investigate whether an acceptable hole could be passed through the composite spar.

Figure 3:
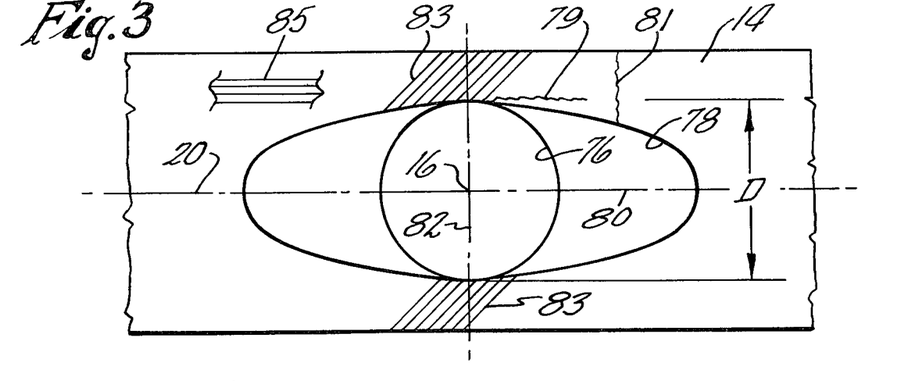
FIG. 3 is an illustration of selectively shaped holes through the helicopter spar for the purpose of explanation.

Relying upon our background in metal spars, we first considered utilizing a circular hole through spar 14 shown as circular hole 76 in FIG. 3. A circular hole would be the easiest to construct and seemed ideal for supporting the pitch actuator shaft 62, which is also circular in cross section. Both analysis and spar testing demonstrated, however, that circular hole 76 was inadequate in that spar 14 with circular hole 76 therein did not have sufficient strength to react the centrifugal loading of the blades. To our surprise we learned that the passing of a circular hole through a composite spar weakened the composite spar substantially greater than it would have weakened a corresponding metallic spar.

We then considered whether it would be advisable to use a circular hole in the spar but increase the thickness $t$ of the spar to return it to its required strength. We determined analytically that this would not be feasible because the weight of our thickened spar would negate the weight saving advantage of the cross-beam rotor concept. It would also be considerably more expensive. With respect to weight, it must be borne in mind that when you increase the thickness $t$ of the spar you also increase the size of the retention plates and you decrease the flexibility of the spar such that you need heavier pitch control mechanisms to flex the spar.

We then commenced investigating the use of noncircular hole through the spar in an attempt to determine whether we could regain some of the tensile strength which was lost in passing a circular hole through the composite spar. By a series of calculations and analysis (finite element) the effects of utilizing various types of non-circular holes through the spar were then determined. The first hole selected was one which was substantially diamond shaped with its major axis on span 20 but it was found that this configuration caused stress concentrations at those points. Then, elliptically shaped holes of various aspect ratios were analytically evaluated and tested at simulated balanced centrifugal load conditions to determine which elliptical hole produced minimum weakening of the spar in passing therethrough. In this trail-and-error fashion, it was determined that, as best shown in FIG. 3, an elliptical hole 78 of an aspect ratio of 2 to 1, with this major axis 80 running along the span 20 of the spar and with its minor axis 82 of dimension D was the optimum hole in that it produced minimum weakening of the spar in passing therethrough. Analysis and test showed that composite spar 14 with elliptical hole 78 passing therethrough had about two and a half times the tensile strength with elliptical hole 78 passing therethrough than with circular 76 passing therethrough. It was accordingly determined that in order to utilize the full weight saving potential of a composite spar, it was necessary to pass holes of noncircular shape therethrough, and preferably elliptical holes.

To avoid stress concentrations, spar hole 78 should have a smooth, and preferably polished surface.

It is interesting to note that when composite spar 14 was tested having circular hole 76 therein, the analytical prediction was substantiated in that the initial failure in the spar was in the form of shear cracks 79 emanating tangentially from the hold and extending in the direction of the unidirectional fibers and blade span and that this resulted in a tensile failure 81 of the spar cross section at a station displaced from the minor axis 82 of hole 76. Contrary to this, the failure of composite spar 14 having elliptical hole 78 therein occurred initially and finally with a tensile failure substantially along the line of the minor axis 82 of the ellipse. We accordingly added diagonal fibers 83 across the spar at axis 82 extending from hole 78 to the spar periphery. Fibers 83 may form any convenient angle with unidirectional fibers 85, such as 45L To this point in our study, we had determined that the elliptically shaped hole 78 was dramatically better than the circularly shaped hole 76 in spar 14 and that the elliptically shaped hole was adequate to handle centrifugal loading of the blades at the opposite ends thereof when that centrifugal loading was balanced.

If our problem had been merely to react balanced blade centrifugal loads or provide a clearance hole in composite spar 14 that would allow another member to pass through the composite spar without contacting it, the use of a noncircular or elliptical hole 78 alone would be adequate.

We faced the added problem, however, that spar 14 would be operating under conditions when the centrifugal loads of the rotor were unbalanced and the spar construction must be capable of handling unbalance centrifugal loads in the rotor. These unbalanced centrifugal loads are caused when the blades at opposite ends of the spar are subjected to different aerodynamic loadings, and hence different centrifugal loadings, so that we have an unbalanced net centrifugal load on the spar attempting to move the spar off its axis of rotation 16. Means must be provided to retain the spar on axis 16 during these operating conditions. It was realized that the pitch change shaft 62 could not be utilized to perform this blade centering function because loading it in any way would cause it to bind. Because the pitch change shaft could not be used for this purpose, it was realized that an intermediate member must be utilized for this purpose. It was therefore decided to use a centering pin 74 or bushing enveloping the pitch change shaft 62 with running clearance and supported in hole 78 and connected to the retaining plate 46 and 48, which are connected to the transmission 58. In reacting an unbalanced centrifugal load, the unbalanced load must be imparted from the spar to the centering pin 74 and then to the retention plates 46 and 48 and from there into the transmission housing 58 in the fuselage. There must at all times remain a running clearance between the pitch change shaft 62 and the centering pin 74, otherwise, the shaft would bind and it would be impossible to change pitch when desired.

It will therefore be seen that spar hole 78 must serve a centering function in supporting centering pin 74 so that hole 78 must be more than a clearance hole through which pitch change shaft 62 passes. We next faced the problem of how to support centering pin 74 from hole 78 without weakening spar 14 and so that pin 74 could perform its centering function.

We first planned to retain centering pin 74 by utilizing an elliptically shaped plug with a central circular opening therein which could be sleeved over pin 74 and which would be received in elliptical spar hole 78 with slight clearance, for example about 0.005 inch. We planned to attached and support the plug from the spar hole 78 by a high modulus structural adhesive which filled the 0.005 inch void between the outer diameter of the elliptical plug and the surface of the spar elliptical hole 78. Analysis and test showed that this type of construction was unacceptable because it was so rigid that the composite spar 14 reacted loadwise as if it has a circular hole 76 therethrough, and we realized that we were losing the tensile strength benefits of the elliptical hole 78 by utilizing such a rigid construction.

This brought us to the realization that it was necessary to isolate the elliptical plug from the elliptical spar hole so that the presence of the elliptical plug does not adversely affect the smooth stress flow pattern around the spar hole so as to thereby reduce its strength. It was realized, however, that whatever means is used to perform this isolation function must also be competent to carry the unbalance centrifugal loads therethrough from the spar to pin 74. These requirements were apparently contradictory since an extremely soft isolation means would minimally affect the stress flow lines around the spar hole and extremely stiff isolation means would most easily transfer the unbalanced centrifugal load therethrough. Means to accomplish both functions were chosen from a group of potential spring or resilient members including springs and elastomers. It was decided that an elastomer would probably be the best isolating material.

Figure 5:
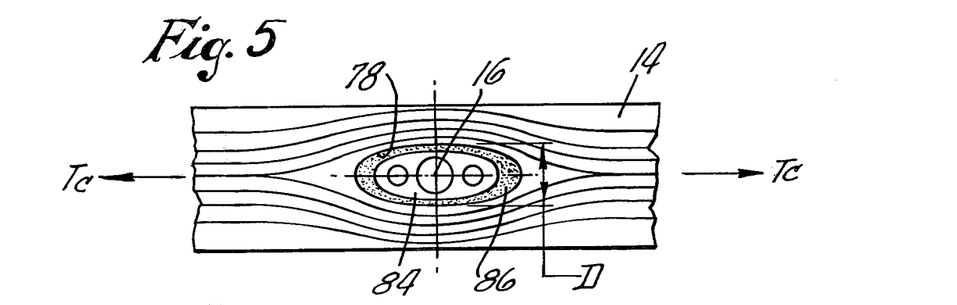
FIG. 5 is a showing of the floating centering member mounted in the composite spar hole and illustrating stress flow lines through the spar when reacting balanced centrifugal blade loading.

It was therefore decided to suspend the elliptical plug 84 from the inner wall of the elliptical hole 78 in the spar by an elastomer of controlled dimension to thereby loadwise isolate the elliptical plug and the centering pin 74 from the composite spar. We found that the dimension of the elastomer between the elliptical hole and the elliptical plug, the shape factor and the durometer of the elastomer were of prime importance. The first requirement for the elastomer is that it must be sufficient compliant that it will allow the undisturbed flow of stress around the elliptical hole 78 and through spar 14 in the fashion shown in FIG. 5 when the spar is reacting a balanced centrifugal load situation. In FIG. 5, the floating elliptical plug is identified as 84 and the elastomer is identified as 86. Plug 84 is preferably made of titanium or aluminum, may include lightening holes and is of substantially the same thickness $t$ as spar 14. It will be noted by viewing FIG. 5 that under the balanced centrifugal load situation, the stress flow lines flow smoothly around elliptical hole 78 since the elastomer 86 has sufficient compliance. If the elastomer 86 did not have sufficient compliance, we would again encounter the problem which we encountered when we attempted to use a rigid bond between the elliptical hole and the elliptical plug. The second requirement for the elastomer 86 is that it has sufficient strength to be able to react the unbalanced centrifugal load situation discussed earlier and illustrated in FIG. 6 as $t_c$ and wherein the elastomer dimension between hole 78 and plug 84 along the common major axis 80 is $d_1$ and the dimension of the elastomer between hole 78 and plug 84 along inner axis 82 is $d_2$.

We conducted a series of analysis and tests to determine the dimension of the elastomer which would give the desired flexibility to minimally effect the stress flow line pattern around the spar hole during balanced rotor operation and transferring unbalanced centrifugal loads during unbalance rotor operation. These series of tests, which were actually trial and error, determined the spring rate which was required of the elastomer at various stations around the hole and from that was determined the durometer, dimension and shape factor of the elastomer which would be required to produce that spring rate, and this also determined the shape of the aluminum plug which was to be suspended from the spar hole by the selectively dimensioned elastomer.

In determining or developing the optimum shape of the spar hole and the required characteristics of the elastomer, we utilize the finite element computer program. In utilizing this finite element computer program, the tensile strength of the composite spar along the minor axis of the elliptical hole was determined for elliptical holes having different major and minor axis dimensions so that through iteration the elliptical shape was determined which produced maximum spar tensile strength along the minor axis of the ellipse. By utilizing this analytical tool were we able to find the elliptical hole 78 of optimum proportion. The optimum size and shape of elliptical hole 78 was by no means obvious.

Figure 4:
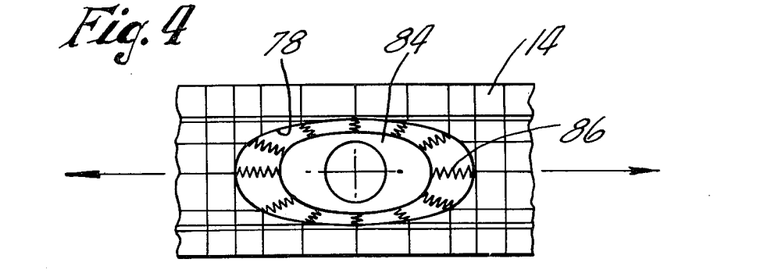
FIG. 4 shows a finite element model using in designing the floating center member taught herein.

Having established the optimum shape of elliptical hole 78 in spar 14, our second step was to utilize finite element models of the type shown in FIG. 4 with the plug 84 suspended from elliptical hole 78 by a series of springs such as 86 whose spring constant $K_{si}$ is a function of shape factor, durometer and dimension of the elastomer which it is substituting for. By iteration, we so suspended several elliptical plugs 84 of different elliptical shapes from springs 86 in previously selected optimum spar hole 78.

What we are actually doing by this process is to determine the shape of elliptical hole 78 in the spar and the shape of elliptical plug 84 which, when suspended from hole 78 by the required elastomer will give us a construction in which the stress concentration factor $K_t$ is substantially unity for the unplugged hole 78 and of minimum variation therefrom and no more than 1.05 times the stress concentration factor of the unplugged hole, when the hole is so plugged. Stress concentration factor $K_t$ is the ratio of the maximum stress at the edge of hole 78 divided by the average stress across the spar at the hole 78, and in particular along axis 82 thereof. The optimum value for stress concentration factor $K_t$ is one and this would mean that we achieved absolutely equal stress throughout the spar across the hole along axis 82. This is only accomplishable in theory, so that we selected our hole size and shape so that the stress concentration factor $K_t$ is as near to unity as possible.

It will therefore be seen that we have utilized finite element computer process to determine the stress concentration factor $K_t$ across the hole 78 in the spar 14, assuming various sizes and shapes of the hole on what amounts to a trial and error basis to first determine the size and shape of the elliptical hole 78 which will give us the best possible stress concentration factor $K_t$, unity being optimum. We then utilize iteration in the same finite element model computer process using a series of differently shaped floating plugs 84 in the already selected elliptically shaped spar hole 78 determining in each instance the stress concentration factor $K_t$ of this combination of parts, namely the spar with elliptical holes 78 therein and the floating plug 84 supported by a series of springs 86 representing the elastomer, with the object of again determining the stress concentration factor $K_t$ which is as near as possible to the original $K_t$ of the unplugged hole, and under no circumstances greater than 1.05 times the stress concentration factor of the unplugged hole. This will give us a plugged hole which has maximum tensile strength of the spar across the hole. When the stress concentration factor $K_t$ for the unplugged hole and the plugged hole are equal under balanced centrifugal loading, the plug is in load isolation from the spar. However, this might not give us the solution to our problem because there is a second requirement mentioned supra that the elastomer need be strong enough to react the unbalanced centrifugal load forces to which the spar is subjected.

Figure 6:
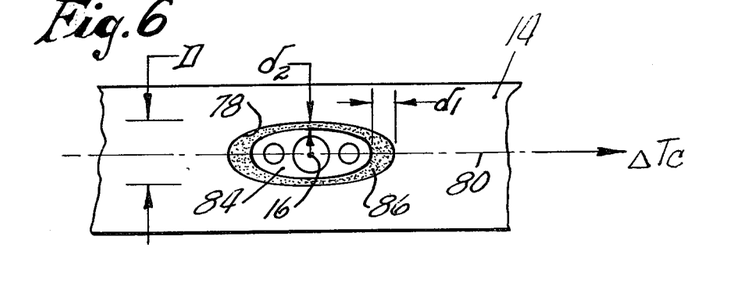
FIG. 6 is an illustration of the floating centering member mounted in the spar for the purpose of demonstrating the importance of elastomer dimension during unbalanced centrifugal load operation.
Figure 7:
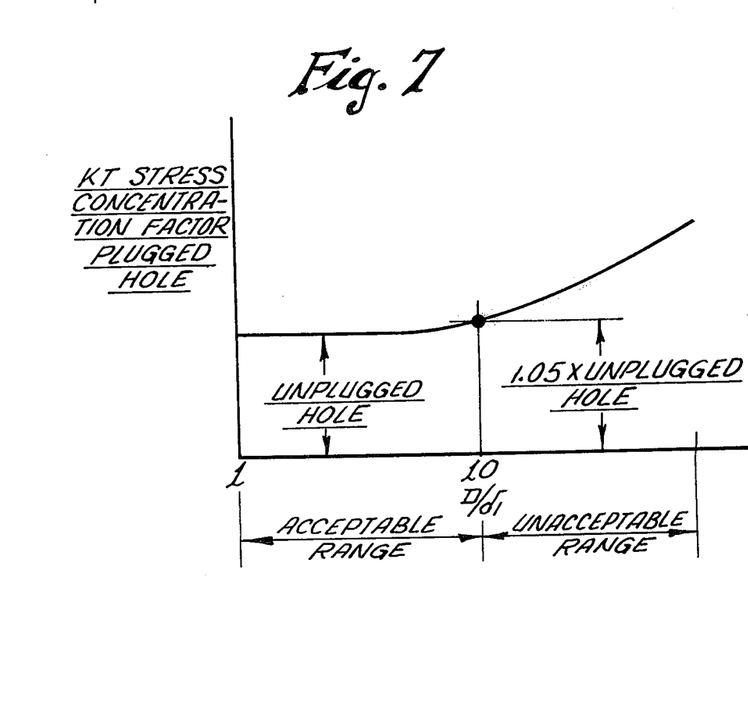
FIG. 7 is a graph showing the spar stress concentration factor across the spar hole plotted against the ratio of the dimension D of the minor axis of the spar hole and the dimension $d_1$, namely the spacing between the spar hole and the centering member taken along their common major axis and under the condition where the composite spar is reacting balanced centrifugal blade loads.
Figure 8:
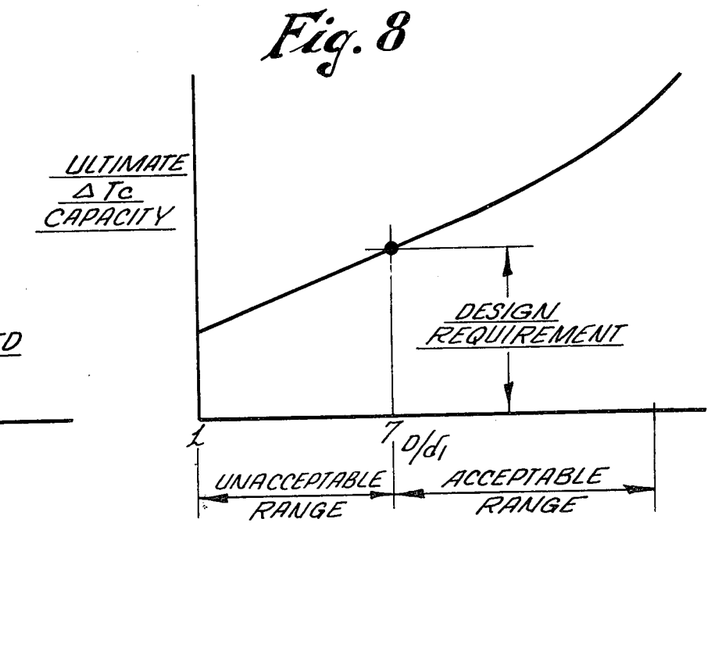
FIG. 8 is a graph plotting the ultimate unbalance centrifugal load reaction capacity of the spar against the same $D/d_1$ ratio.

FIGS. 7 and 8 represent a plot of findings determined by our finite element computer procedure wherein FIG. 7 represents the stress concentration factor $K_t$ for the unplugged hole 78 and the plugged hole plotted against the ratio of the minor axis of the elliptical hole D and the dimension $d_1$ of the elastomer along the ellipse common major axis 80, best shown in FIG. 6, for a balanced spar centrifugal load situation. Note by observing FIG. 7 that the stress concentration factor of the unplugged hole is equal to 1.05 times the stress concentration factor of the plugged hole when the ratio D divided by $d_1$ is 10. As elastomer dimension $d_1$ increases, the ratio reduces below 10 and remains in the designated acceptable range. This means that in the balanced centrifugal load situation, an increase in elastomer dimension $d_1$ provides better results and that acceptable results are achieved when the ratio $D/d_1$ is 10 or less.

FIG. 8 shows the ultimate unbalanced load carrying capacity of the spar $t_c$ plotted against the same ratio $D/d_1$. From past experience in rotor design, it is known that the unbalanced centrifugal load which must be accommodated by the spar is about 1 percent of the blade normal centrifugal load. This was established as a design requirement. It will be noted by viewing FIG. 8 that for the unbalanced centrifugal load situation, we have a contradictory situation to that of the balanced load situation in that, while at the above-mentioned designed requirement, the ratio $D/d_1$ is 7, lessening of elastomer dimension $d_1$ will give us improved results in ultimate $t$ capacity into the designated acceptable range.

When viewing the results of FIGS. 7 and 8, it will therefore be seen that to satisfy the requirements of the balanced centrifugal load situation of FIG. 7 and the unbalanced centrifugal load situation of FIG. 8 the ratio of $D/d_1$ must be between 7 and 10.

It will therefore be seen that we have devised a unique method of designing interconnecting members 84 and 86 between spar hole 78 and centering pin 74. Following our method, a metal plug 84 is suspended in spar hole 78 by means of an elastomer layer 86 of selected shape, thickness and durometer. The elastomer layer 86 is designed to allow for the transfer of loads from the spar to the locating pins 74 and to prevent disturbance of the stress flow pattern around hole 78 in the spar. We determined that there is a very restricted range of elastomer shape and dimension that can meet both the load transfer and isolation criteria.

We have found that an elastomer which is a polyurethane rubber known as PR1535 and is produced by Products Research Corporation of Glendale, California, is satisfactory for our configuration in which spar 14 was a unidirectional graphite fiber-epoxy spar whose dimensions in cross section were 5.15 inches at W by 0.60 inches at $t$. This elastomer is of the same thickness $t$ as plug 84 and spar 14 and has a durometer of 50 and a shape factor that varies from 6 at the thinnest rubber section to 0.8 at the thickest rubber section.

For a more complete understanding of the properties of elastomers and the significance of their shape factor, durometer and dimension, reference is hereby made to the Handbook of Molded and Extruded Rubber, The Goodyear Tire & Rubber Company, Akron, Ohio, 2nd edition, copyright 1959. We found that our optimum configuration occurred when D is 2.75 inches, $d_1$ is 0.375 inch and $d_2$ is 0.050 inch.

The thickness of the elastomer was set equal to the thickness of the spar. This gives us the maximum elastomer compression area (without exceeding the spar envelope) available to carry the unbalanced centrifugal load.

While we have given the dimensions which we found optimum for our configuration, the procedure taught herein can be used to determine the optimum configuration for any and all blade configurations.

We found it desirable to determine dimension D as follows:

We begin with the required diameter for the pitch actuator shaft 62, which was 2.5 inches. We then provided for a minimum dimensioned wall thickness for centering pin 74 which will be pressed into retention plates 46 and 48 for spar centering purposes. A small amount of clearance must be provided between the pitch actuator shaft 62 outer diameter and the centering pin 74 inner diameter for free reciprocal motion of the shaft within the centering pin. We allowed a clearance of 0.030 diametrical inch. This clearance is deemed sufficient since the unbalanced centrifugal rotor loads are imparted from the spar, through the elastomer, then through the plug 84 to pin 86, which is press fitted into 46 or 48, and therefore then into plates 46 and 48. Bushing 91 supports shaft 62 within pin 74 as shown in FIG. 9. We then designed elliptical plug 84 with absolute minimum wall thickness along the minor axis 82 to function as a bushing without fracturing along this wall when loaded. Further, plug 84 must be dimensioned along its minor axis allowing for a slight closing up diametrically of spar hole 78 due to the centrifugal load applied to the spar ends by the blades. With respect to the dimension $d_2$ of the elastomer along the ellipse minor axis, all that must be ensured is that the floating plug 84 does not touch the spar hole 78, particularly along this minor axis 82. The elastomer can be very thin at dimension $d_2$ because there is no relative motion in the elastomer due to stretching of the spar under centrifugal load at the minor axis 82, and because none of the unidirectional fibers of the spar are cut at this particular point. In view of the fact that as we move away from the center of the spar along its major axis 80 in either direction the spar hole cuts progressively more and more unidirectional fibers, we encounter greater movement of hole 78 due to centrifugal loading and this requires greater thickness of elastomer in effecting a dimension $d_1$ so that the floating plug 84 is in fact isolated loadwise from the spar hole.

It should be understood that the invention is not limited to the particular embodiments shown and described herein, but that various changes and modifications may be made without departing from the spirit or scope of this novel concept as defined by the following claims.

We claim:
1. A two-bladed rotor adapted to be mounted for rotation about an axis of rotation and including:
   A. an aerodynamic blade positioned on each side of and substantially equidistant from the axis of rotation,
   B. a central spar of rectangular cross section extending through the axis of rotation and connected to each blade to support the blades for rotation about the axis of rotation,
      1. being made of high modulus fibers extending substantially parallel to the blade span and joined by a binder, and
      2. having an elliptically shaped hole severing said fibers and passing therethrough concentrically about the axis of rotation and with the major axis of the ellipse parallel to the blade span and shaped and sized to produce minimum stress concentration factor across the spar at the hole as the spar carries balanced centrifugal blade loads during rotor rotation,
   C. blade pitch change means including a shaft member of circular cross section and extending along and concentric about said axis of rotation and extending through said spar hole,
   D. a cylindrical centering pin enveloping said shaft member and located within said spar hole,
   E. an elliptically shaped plug member having a circular inner diameter enveloping and matingly engaging said centering pin and having an elliptical outer surface enveloped within and in spaced relation to the elliptical spar hole so as to define concentric ellipses therewith and sized to define a cavity therebetween which has selected dimension along the common ellipse major axis and the common ellipse minor axis,
   F. an elastomer of selected durometer and shape factor filling said cavity to support said elliptical plug member from said elliptical spar hole in float- ing relationship so that the stress concentration factor created as the spar carries balanced centrifugal blade loads across the spar hole-elastomer-floating plug-centering pin combination is substantially equal to said stress concentration factor so established in the spar by carrying balanced centrifugal blade loads through said spar hole along, and further, so that the elastomer is capable of withstanding anticipated unequal centrifugal blade loads thereacross, and G. means independent of said plug member and said elastomer to support and drive said spar and blades in rotation about said axis of rotation.

2. A rotor according to claim 1 wherein said plug member and centering pin are integral.

3. A rotor according to claim 1 wherein the elliptically shaped hole in the spar has a major axis-to-minor axis ratio of 2/1.

4. A rotor according to claim 3 wherein the ratio of the minor axis of the spar elliptical hole, D, to the elastomer dimension $d_1$ at the opposite ends of the plug member along the ellipse major axis is between 7/1 and 10/1.

5. A rotor according to claim 1 wherein said centering pin envelops said shaft member with shaft running clearance therebetween, and wherein said pitch change means includes means to cause said shaft member to reciprocate along said axis of rotation, and means connecting said shaft member to said spar on opposite sides of said axis of rotation so that reciprocation of said shaft member causes said spar to flex and hence causes said blades to change pitch selectively.

6. A rotor according to claim 1 wherein said rotor is a helicopter rotor supported for rotation from a helicopter, means connecting said centering pin to said helicopter so that unbalanced blade centrifugal loads may be imparted through said elastomer and said plug member to said centering pin and thence to said helicopter.

7. A rotor according to claim 1 and including a plurality of high modulus fibers forming part of said spar and extending from said elliptically shaped hole outwardly into said spar at substantial angles with respect to the said substantially parallel fibers and joined thereto by said binder.

8. A rotor according to claim 1 including means to cause said pitch change shaft member to reciprocate along said axis of rotation to vary blade pitch.

9. A rotor according to claim 8 wherein said pitch means is protectively housed within said first named means.

10. In a helicopter rotor adapted to be rotated about an axis of rotation and to experience pitch change variation about a pitch change axis including:

A. a unidirectional composite spar having a series of high modulus fibers extending in parallel relationship to each other and to the spar span, B. a hole severing said fibers and extending through the spar and being of selected elliptical shape so that the stress concentration factor across the spar at the hole is as near unity as possible when the spar carries balanced centrifugal loads, C. a floating spar centering member of selected elliptical shape positioned in said hole in said spar to define a selectively shaped cavity therebetween having its maximum dimension along the spar span and its minimum dimension normal thereto, said centering member having a central hole therein, D. an elastomer of selected shape factor, durometer and dimension filling said cavity and supporting said centering member from said spar hole so that the stress concentration factor in the spar at the hole with the centering member so suspended is substantially the same as the stress concentration factor of the spar before the centering member was so suspended when the spar carries balanced centrifugal loads, E. means independent of said centering member and said elastomer to support and drive said spar in rotation about said axis of rotation, and F. pitch change means extending through said centering member central hole.

11. A blade according to claim 10 wherein said elastomer is also of selected shape factor, durometer, and dimension to transmit unbalanced centrifugal loads from said spar to said centering member.

12. A rotor according to claim 10 wherein said centering member has a central opening and including pitch change means comprising a pitch change shaft extending along said axis of rotation and passing through said central opening in said centering member with running clearance therebetween, means actuating said shaft to reciprocate along said axis of rotation, and means connecting said shaft to said spar on opposite sides of said axis of rotation so that reciprocation of said shaft causes flexure of said spar about the spar span and hence rotor pitch change variation.

13. A rotor according to claim 12 and including means to ballistically protect said shaft actuating means.

14. A rotor according to claim 10 and including means rigidly positioning said centering member so that unbalanced centrifugal spar loads are passed through said elastomer to said centering member.

15. A helicopter cross-beam rotor having two blades mounted at opposite ends of each spar for rotation therewith about an axis of rotation and wherein said spar is a composite, flexible member comprising a plurality of unidirectional, high-tensile strength fibers extending parallel to one another along the spar span and joined by a binder to form a flat central section of selected width and thickness and including:

A. an elliptically shaped hole severing said fibers and passing through said spar concentrically about said axis of rotation and with the major axis extending along the spar span and the minor axis extending normal to the spar span and with the dimension D of said hole minor axis selected so that the spar material at the opposite ends of the elliptical hole minor axis has sufficient tensile strength to carry all rotor balanced and unbalanced loading and wherein the elliptical hole is shaped so that the tensile strength of the spar across the hole minor axis is maximum and so that the stress concentration factor $K_t$ thereacross approaches unity, B. an elliptically shaped plug positioned in said spar hole and including a central circular opening and having selected major and minor axis dimensions so that the ratio therebetween is larger than the corresponding ratio of the spar elliptical hole and so that a selectively shaped cavity is formed between the plug and the hole having dimension $d_1$ along the common major axis of the elliptical hole and the elliptical plug and smaller dimension $d_2$ along their common minor axis, C. a centering pin received in said central opening of said elliptical plug,
D. an elastomer of selected durometer and shape factor filling said cavity between said hole and said plug outer periphery and being bonded to each, so that due to the compliance of the elastomer, the spar tensile strength and stress concentration factor across the spar elliptical hole is substantially undisturbed by the presence of the elastomer, plug and pin in the spar hole when the spar is carrying balanced centrifugal loads and wherein said elastomer has sufficient strength to carry all unbalanced rotor centrifugal loads to said plug,
E. pitch change means extending through said centering pin, and
F. means independent of said plug and said elastomer to support and drive the rotor about said axis of rotation.

16. A rotor according to claim 15 wherein the dimensions D and $d_1$ form a ratio $D/d_1$ between 7 and 10.

17. A rotor according to claim 15 wherein said centering pin has a central opening and including pitch change means comprising a shaft member supported for reciprocating motion along said axis of rotation and extending with running clearance through said central opening in said centering pin, means to cause said shaft to reciprocate along said axis of rotation, and means connecting said shaft to said spar on opposite sides of said axis of rotation so that reciprocation of said shaft causes said spar to flex about the spar span to thereby vary blade pitch.

18. A rotor according to claim 15 including means rigidly supporting said centering pin about said axis of rotation so that unbalanced rotor centrifugal loads are passed through said elastomer to said plug and hence to said centering pin to thereby retain the rotor concentric about said axis of rotation.

* * * * *

UNITED STATES PATENT OFFICE
CERTIFICATE OF CORRECTION

PATENT NO. : 4,008,980
DATED : February 22, 1977
INVENTOR(S) : William Lawrence Noehren and Edward Stanley Hibyan It is certified that error appears in the above-identified patent and that said Letters Patent are hereby corrected as shown below:

Column 1, line 61: "with" should be -- within --

Column 1, line 62: "complaint" should be -- compliant --

Column 2, line 7: "floating" should be -- floatingly --

Column 2, line 15: "teaching" should be -- teachings --

Column 3, line 1: "four-blade" should be -- four-bladed --

Column 3, line 45: "of" should be -- or --

Column 3, line 46: "Fibers" should be -- Fiber --

Column 3, line 65: after "the" insert -- pitch horn 38 by the --

Column 4, line 23: "blade" should be -- blades --

Column 4, line 26: before "positioned" insert -- are --

Column 4, line 30: after "cross-beam" insert -- rotor --

Column 4, line 55: cancel "of" (second occurrence)

Column 5, line 28: "6" should be -- 66 --

Column 6, line 1: "savings" should be -- saving --

Column 6, line 33: "hold" should be -- hole --

UNITED STATES PATENT OFFICE
CERTIFICATE OF CORRECTION

PATENT NO. : 4,008,980
DATED : February 22, 1977
INVENTOR(S) : William Lawrence Noehren and Edward Stanley Hibyan It is certified that error appears in the above-identified patent and that said Letters Patent are hereby corrected as shown below:

Column 6, line 51: after "sufficient" insert -- tensile --

Column 7, line 2: "hole" should be -- holes --

Column 7, line 16: "trail-and-error" should be -- trial-and-error --

Column 7, line 48: "45L" should be -- 45 degrees.--

Column 8, line 13: "plate" should be -- plates --

Column 8, line 35: "attached" should be -- attach --

Column 8, line 41: "has" should be -- had --

Column 13, line 50: before "means" insert -- change shaft member actuating --

Signed and Sealed this

Seventh Day of June 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 4,008,980
DATED : February 22, 1977
INVENTOR(S) : WILLIAM LAWRENCE NOEHREN and EDWARD STANLEY HIBYAN It is certified that error appears in the above-identified patent and that said Letters Patent are hereby corrected as shown below:

Column 10, Line 52    Cancel "unplugged" and insert

--plugged--

Column 10, Line 53    Cancel "plugged" and insert

--unplugged--

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*